(12) United States Patent
Kvernvik et al.

(10) Patent No.: US 9,654,590 B2
(45) Date of Patent: May 16, 2017

(54) METHOD AND ARRANGEMENT IN A COMMUNICATION NETWORK

(75) Inventors: Tor Kvernvik, Täby (SE); Martin Svensson, San Francisco, CA (US)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 857 days.

(21) Appl. No.: 13/377,796

(22) PCT Filed: Jun. 26, 2009

(86) PCT No.: PCT/SE2009/050821
§ 371 (c)(1),
(2), (4) Date: Dec. 12, 2011

(87) PCT Pub. No.: WO2010/151194
PCT Pub. Date: Dec. 29, 2010

(65) Prior Publication Data
US 2012/0096156 A1    Apr. 19, 2012

(51) Int. Cl.
*G06F 15/173* (2006.01)
*H04L 29/08* (2006.01)
(Continued)

(52) U.S. Cl.
CPC .......... *H04L 67/306* (2013.01); *H04M 15/00* (2013.01); *H04M 15/09* (2013.01); *H04M 15/41* (2013.01);
(Continued)

(58) Field of Classification Search
CPC ............................. H04L 67/306; H04L 67/22
(Continued)

(56) References Cited

U.S. PATENT DOCUMENTS 6,134,532 A    10/2000 Lazarus et al.
8,452,653 B1 *  5/2013 Gottfurcht et al. ........ 705/14.25
(Continued)

FOREIGN PATENT DOCUMENTS

CN    1682552 A    10/2005
CN    1852353 A    10/2006
(Continued)

OTHER PUBLICATIONS

Communication with Supplementary European Search Report, Application No. EP 09 84 6608, Nov. 23, 2012.
(Continued)

*Primary Examiner* — Michael Y Won
*Assistant Examiner* — Karina J Garcia-Ching
(74) *Attorney, Agent, or Firm* — Patents on Demand P.A.; Brian K. Buchheit; Scott M. Garrett (57) ABSTRACT

A method and apparatus for providing labelling information to a third party regarding terminal users in a communication network. A labelling unit receives communication related data generated from executed communications of the terminal users, and fetches stored labelling rules which have been configured specifically for the third party. The labelling unit then converts the communication related data into labelling information, where a communication habits vector is determined by applying the fetched labelling rules on the received communication related data, and the labelling information is determined for the terminal user(s) based on the resulting communication habits vector. The determined labelling information is finally delivered to the third party.

13 Claims, 3 Drawing Sheets

(51) Int. Cl.
  *H04M 15/00* (2006.01)
  *H04L 12/14* (2006.01)
  *H04L 12/24* (2006.01)

(52) U.S. Cl.
  CPC ........... *H04M 15/44* (2013.01); *H04M 15/58* (2013.01); *H04L 12/1428* (2013.01); *H04L 41/5022* (2013.01); *H04L 67/22* (2013.01)

(58) Field of Classification Search
  USPC ........................................................ 709/224
  See application file for complete search history.

(56) References Cited

U.S. PATENT DOCUMENTS

| | | | |
|---|---|---|---|
| 2002/0144174 A1 | 10/2002 | Nwabueze | |
| 2005/0075886 A1* | 4/2005 | LeFebvre et al. | 704/276 |
| 2006/0036560 A1* | 2/2006 | Fogel | 706/45 |
| 2007/0043742 A1* | 2/2007 | Arguello et al. | 707/100 |
| 2007/0121522 A1 | 5/2007 | Carter | |
| 2008/0140436 A1 | 6/2008 | Burkhardt et al. | |
| 2008/0214157 A1* | 9/2008 | Ramer | G06F 17/30749 455/414.1 |
| 2008/0249968 A1 | 10/2008 | Flinn et al. | |
| 2009/0006469 A1 | 1/2009 | Jain et al. | |
| 2009/0124241 A1 | 5/2009 | Krishnaswamy et al. | |
| 2010/0274815 A1* | 10/2010 | Vanasco | 707/798 |

FOREIGN PATENT DOCUMENTS

| | | |
|---|---|---|
| CN | 1852355 A | 10/2006 |
| DE | 198 57 336 C1 | 3/2000 |
| EP | 1401224 A1 | 3/2004 |
| EP | 1 711 025 A2 | 10/2006 |
| WO | WO 2006/111952 A2 | 10/2006 |

OTHER PUBLICATIONS

International Search Report, PCT/SE2009/050821, Mar. 30, 2010.
Chinese Office Action Corresponding to Chinese Patent Application No. 200980160085.7; Date Mailed: Aug. 5, 2014; Foreign Text, 7 Pages, English Translation Thereof, 7 Pages.

* cited by examiner

METHOD AND ARRANGEMENT IN A COMMUNICATION NETWORK

CROSS-REFERENCE TO RELATED APPLICATION

This application is a 35 U.S.C. §371 national stage application of PCT International Application No. PCT/SE2009/050821, filed on 26 Jun. 2009, the disclosure and content of which is incorporated by reference herein as if set forth in its entirety.

FIELD

The invention relates generally to a method and arrangement for providing information on terminal users in a communication network to a receiving third party in an efficient and comprehensible manner.

BACKGROUND

With the emergence of new communication techniques, different types of mobile and fixed terminals capable of multimedia communication have been developed for enabling users to consume multimedia services. New services involving communication of various types of media, are also constantly being developed for terminal users to increase the field of usage for their communication terminals. In the following text, the term "user services" generally represents any type of services that can be activated for a user of a communication terminal. User services are thus somehow related to the user, e.g. services depending on the user's geographic position, terminal type, use of address lists, and so forth.

Recently, solutions have been devised for creating and offering relevant and potentially attractive services that have been adapted to different service consumers according to their interests and needs in different situations. These user services can thus be customised for individual users depending on their user profiles and/or current situation. Some examples are advertisements and personalised TV. Solutions have also been suggested for managing groups or "clusters" of users with similar behaviours, and for adapting various user services to the common characteristics of these user groups. WO 06/115442 (Ericsson) discloses a mechanism where the particular needs of a user group can be met by providing relevant context information that has been adapted to particular interests and needs of the group.

Differentiated adaptation of services for users and user groups may depend on and require that information on the users' profile, current situation, as well as earlier behaviour and habits, is available to the service providers in a useful manner. This kind of information can be extracted from different sources, typically traffic data available in communication networks, i.e. information on executed calls and other sessions such as SMS (Short Message Service), MMS (Multimedia Message Service), IMS sessions, and so forth, using various data mining techniques which have been developed recently. For example, so-called "Machine Learning" (ML) algorithms and tools can be used for the extraction of relevant and useful information on the users from the available traffic data, which may be utilised by operators when developing and introducing new services.

Great amounts of traffic data are thus generally available from Charging Data Records (CDR) which are usually generated and stored for the networks to support charging for executed calls and sessions. Traffic data can also be obtained by means of various traffic analysing devices, such as Deep Packet Inspection (DPI) analysers, which can be installed at communication nodes in the network. Further, the CDR data may be generated from DPI data in some cases. The traffic may involve various communications services that can be detected in this way, such as voice, SMS, MMS, peer-to-peer services, downloading, streaming, and so forth.

A Data Mining Engine (DME) may further be employed that collects traffic data and extracts user information therefrom using various data mining and machine learning algorithms. The DME may even be used to obtain information on the social relations between different users, and even the "strength" of those relations, depending on the amount and type of communications these users have conducted with each other as well as time of day, duration and location when making their calls and sessions.

However, the above-described data mining and machine learning algorithms typically provide rather "raw" output data which can be difficult to interpret and understand for different receiving parties such as service providers or the like, either external or internal. The traffic data may also originate from different communication techniques producing different outcomes from the algorithms above. In addition, no useful universal and consistent "language" has yet been defined and established to describe, e.g., different types of service usage and social relations in a uniform or standardised manner understandable for any data receiving parties. As a result, the output data from a DME of today may well be interpreted differently by different receiving parties, and/or may not even be properly understood at all or interpreted inaccurately.

The DME data is also often presented in communication technology specific terms requiring special knowledge to understand. It is therefore not unusual to employ experts skilled in data mining and communication techniques in order to interpret, process and describe the DME output data correctly. These persons should thus be very accomplished in interpreting data mining results as well as in behavioural science, among other things. Employing such experts may be costly or not even possible. Still further, different experts may describe the DME output data in different ways with inconsistent terms.

Figure 1:
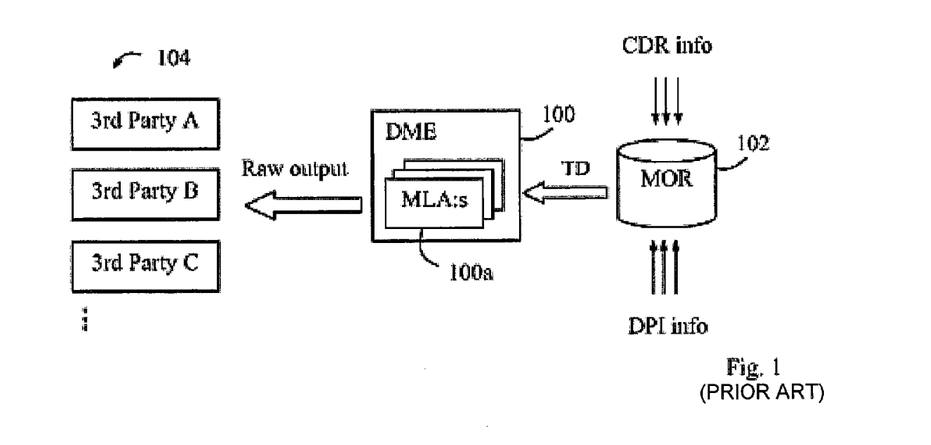
FIG. 1 is a schematic block diagram illustrating data mining in a communication network, according to the prior art.

FIG. 1 illustrates an example of how data mining can be employed for a communication network, according to the prior art. A data mining engine (DME) 100 comprises various machine learning algorithms (MLA:s) 100a which are used for processing traffic data (TD) provided from a so-called "Mining Object Repository" (MOR) 102. The MOR 102 collects CDR information and DPI information, either intermittently or on a more continuous basis, from the network in the manner described above. After processing the traffic data, the DME 100 provides raw output data to a plurality of third parties 104 (A,B,C . . . ), e.g. different service providers, and such DME data may be difficult to interpret and use, as explained above. It is thus up to the receiving third parties 104 how the output data from the DME 100 is interpreted and used, e.g. in terms of user profiles, social networks, user segments, and so forth, which may require considerable efforts and skills.

SUMMARY

It is an object of the present invention to address at least some of the issues outlined above. It is thus an object to provide useful and intelligible information on terminal users in the network, based on their communication habits and service usage. These objects and others can be achieved primarily by a solution according to the appended independent claims.

According to different aspects, a method and an apparatus are defined for providing labelling information to a receiving third party regarding one or more terminal users in a communication network, by means of a labelling unit connected to a data mining system.

In the inventive method, communication related data is received which has been generated from executed communications of the one or more terminal users. Further, labelling rules which have been configured and stored in a storage specifically for the third party, are fetched from the storage. The received communication related data is then converted into labelling information, wherein a communication habits vector is determined by applying the fetched labelling rules on the received communication related data, and the labelling information is determined for the terminal user(s) based on the resulting communication habits vector. The labelling information represents a description of the terminal user(s) with respect to their communication habits. The determined labelling information can then be delivered to the third party.

The inventive labelling unit comprises a receiving unit adapted to receive communication related data generated from executed communications of the one or more terminal users. The labelling unit further comprises a converting unit adapted to fetch stored labelling rules which have been configured specifically for the third party, and to convert the received communication related data into labelling information, including determining values of parameters in a communication habits vector by applying the fetched labelling rules on the received communication related data, and determining labelling information for the terminal user(s) based on the communication habits vector. The labelling information represents a description of the terminal user(s) with respect to their communication habits. The labelling unit also comprises a delivery unit adapted to deliver the determined labelling information to the third party.

Using the inventive method and labelling unit above will enable network operators to deliver intelligible information of end users, extracted via machine learning functions, to third parties in a more efficient and consistent way and automatically. The need for data mining experts can also be minimized, as they are only needed when configuring the customer specific labelling rules.

The invented method and labelling unit may be implemented according to any of the following optional embodiments.

In one embodiment, the delivered labelling information includes a label, category or class of the terminal user(s) as defined by the labelling rules. The labelling information may also be described with a terminology independent on the underlying traffic types and communication techniques.

In another embodiment, the delivery unit delivers the labelling information using a protocol and an interface adapted to the third party. In yet another embodiment, the labelling rules are configured in a storage unit by defining the communication habits vector as a plurality of measurable communication habits parameters, and configuring parameter thresholds or intervals as limits for predefined user labels, classes or categories.

In further possible embodiments, the converting unit determines the communication habits vector by determining the values of the communication habits parameters from the received communication related data, and determines a user label, class or category based on the preconfigured limits for each parameter in the communication habits vector. The communication habits vector may be representative for a single terminal user or a cluster of plural terminal users having similar communication habits.

In yet another embodiment, the receiving unit receives the communication related data from a DME (Data Mining Engine) as processed by one or more MLA:s (Machine Learning Algorithms).

In further embodiments, the converting unit includes one or more of: a social network module adapted to create labelling information relating to social network relations of the users, a profile module adapted to generate a profile of a user by customising the user profile expressed in a format used by a DME from which the communication related data is received, and a cluster module adapted to generate a profile of a cluster of users by customising the cluster profile expressed in the format used by the DME.

Further preferred features and benefits of the present invention will become apparent from the detailed description below.

BRIEF DESCRIPTION OF THE DRAWINGS

The invention will now be described in more detail by means of preferred embodiments and with reference to the accompanying drawings, in which.

DETAILED DESCRIPTION

In this description, the term "labelling information" is used to represent a behaviour description of terminal users that can be traced from their communication habits and service usage. Briefly described, the invention provides a solution that enables creation of labelling information for terminal users, for delivery to third parties in an intelligible format which has been individually adapted or customised for each receiving third party according to predefined labelling rules. In this solution, the labelling information can be regarded as "customised" for each receiving third party, even though it is also possible that more than one third party can receive the same type of labelling information.

The labelling information thus basically characterises the users in a comprehensible manner and could also be referred to as classification, categorisation, cataloguing or sorting of users as related to their communication habits and usage of communication services. In this description, "communication habits" basically refer to the usage of communication services, but should further be understood in a broad sense, i.e. any user behaviour or current circumstances when making calls and sessions, e.g. the current geographic position, time of day, duration, type of terminal used, associated address lists, use of terminal functions, and so forth.

The labelling information is created in a novel node or function referred to as a "labelling unit", using communication related data received from a DME or the like. The term "communication related data" is used here to represent any data that can be obtained by means of conventional data mining services, which may include raw traffic data as well as more refined information about users, social networks, clusters and user profiles derived by analyzing the traffic data.

The labelling information describes the terminal users with respect to their communication habits and service usage which can be derived by interpreting and analysing the received communication related data. The labelling information may be expressed as user labels, categories or similar descriptive terms, e.g. referring to behaviours and social relations with other users. Any descriptive terms may be used as the labelling information as stipulated by the predefined labelling rules.

In this description, a "third party" could be any party that is entitled to receive such labelling information, e.g. service or content providers, network operators and vendors, as well as the current operator's own analysing department or the like. The labelling information can be used by the third party to create or adapt services and products that may be provided or offered to the users, although the invention is not limited to any particular use of the labelling information by the third party.

Labelling rules are first defined for a specific third party in a configuring or preparation phase, which may require expert knowledge of persons skilled in data mining and/or communication techniques. The labelling rules can be freely defined and customised for individual third parties, even though default rules may also be selected, to convert, or "translate", the communication related data into labelling information according to the needs and capabilities of each receiving third party.

In an execution phase, the labelling rules are applied on communication related data supplied from a DME or other similar data sources, for executing the above third party adapted translation. In more detail, a logical "communication habits vector" is determined for one or more terminal users from the received communication related data. The communication habits vector is defined by a plurality of measurable communication habits parameters which reflect different aspects of communication habits in technical terms.

Some examples of communication habits parameters that can be measured are: 1) number of executed voice calls, 2) average duration of executed voice calls, 3) number of sent or received SMS:s, 4) amount of Internet sessions during night-time, 5) number of sessions made within a predefined area, and so forth. It can be easily understood that many different types of communication habits parameters can be selected for defining the communication habits vector, and the invention is not limited in this respect. An example of determining such vectors for creating labelling information for users will be described in more detail below with reference to FIG. 4.

In the labelling unit, the labelling information is determined for the terminal user(s) based on the determined communication habits vector. Each communication habits parameter in the communication habits vector can have different predetermined thresholds which dictate the resulting labelling information. Thus, when the value of a measured communication habits parameter for a user or user group exceeds a predetermined threshold, or is within a predetermined interval between two thresholds, a certain labelling information is implied. For example, if the number of executed voice calls exceeds a certain threshold and the average call duration also exceeds another threshold for a user, that user may be labelled "busy speaker". The labelling information may also be expressed as a rating of some user feature, e.g. "Speaking habits" may be rated 1-10 where 1 implies a very sparse speaker and 10 implies a very busy speaker.

Finally, the determined labelling information is delivered to the third party. In this way, the delivered labelling information will have a well-known significance and meaning to the receiving third party. It should be noted that any expert knowledge will basically be required only once, i.e. when defining the labelling rules, but not during the execution phase for interpreting the DME data as in the previously known solutions, which can be a significant advantage.

An exemplary procedure will now be described with reference to FIG. 2, for providing labelling information to a receiving third party regarding one or more terminal users in a communication network. In the figure, a labelling unit 200 is shown which may be controlled by an operator of the network or by a separate party providing the labelling information to any third party entitled to receive the labelling information. The labelling unit 200 comprises a plurality of storage units 202 for holding labelling rules of different individual third parties A, B, C, . . . , a data converter 204 for converting communication related data into customised labelling information, and a plurality of interface units 206 configured for delivering the labelling information to the third parties A, B, C, . . . . In this description, the storage units 202 are treated logically as separate units, although in practice they may be implemented in a common database or the like.

In a first shown step 2:1, labelling rules are configured in the storage units 202 specifically for the individual third parties A, B, C, . . . , which is done independently for each third party. This step is executed for each individual third party as controlled by that party.

Configuring labelling rules includes defining a communication habits vector by a plurality of communication habits parameters, and also configuring parameter thresholds or intervals as limits for different user labels, classes or categories. Any number of such parameters may be selected for defining the communication habits vector, and the vector should be understood as purely logical even though it can be visualised as a spatial vector in the case of 1-3 parameters, which will be made below when describing FIG. 4. In practice, the communication habits vector may typically be defined with 1-10 different communication habits parameters and corresponding limits or thresholds, although without limiting the invention in this respect.

Configuring labelling rules further includes defining the labelling information in terms that are comprehensible to the third party, i.e. the above user labels, classes or categories. The labelling information is preferably described with a terminology independent on the underlying traffic types and communication techniques.

The first step 2:1 is thus made in a preparation phase of the procedure e.g. when setting up the labelling unit 200 and/or whenever a new third party is added, or when some modification is desired in the configuration of any third party. A next step 2:2 illustrates that a DME 208 comprising various MLA:s 208a collects traffic data generated by communication activities of users 210 in a network. The DME 208 also provides communication related data to the labelling unit 200 which is then received by the data converter 204 in a step 2:3 for translation into customised labelling information. Steps 2:2 and 2:3 can be executed independently of each other and more or less continuously. However, the supply of communication related data to the labelling unit 200 may also be done at certain intervals according to a predetermined scheme or on demand from the third party.

In this example, labelling information is to be determined and delivered to a specific third party C, although the same procedure could be executed for any one or more of the third parties A, B, C, . . . . When receiving the communication related data, the data converter 204 thus fetches the labelling rules that were preconfigured for third party C from the storage unit of C, in a next step 2:4.

The data converter 204 then performs a conversion by translating the received communication related data according to the fetched rules, in a step 2:5, into labelling information. The conversion includes a first operation of determining parameter values in the communication habits vector, and a second operation of determining a user label, class or category that corresponds to the resulting communication habits vector as determined by the preconfigured limits for each parameter. It is also possible to present the parameter values as such as the labelling information, thereby basically omitting the second operation above. Hence, the determined user label, class or category is then delivered as labelling information to third party C over the interface of C, as shown in a final step 2:6.

Another exemplary procedure will now be described with reference to the flow chart in FIG. 3. The procedure comprises steps executed by a labelling unit connected to a data mining system, basically acting as the labelling unit 200 in FIG. 2, for providing customised labelling information to a receiving third party regarding one or more terminal users in a communication network. It is assumed that labelling rules that have been preconfigured in the labelling unit for the third party basically as described for step 2:1 above. It should be noted that, even though only one third party is described here, the following may be valid for delivering customised labelling information to any number of third parties.

In a first step 300, communication related data is received from a DME or the like which has been analysed, or "data mined", by the DME, basically corresponding to step 2:3 above. The DME has thus generated the communication related data from communications executed by the terminal user(s), basically in the manner described above. In a next step 302, the labelling rules that have been preconfigured in the labelling unit specifically for the third party are fetched from the rule storage, basically corresponding to step 2:4 above.

Then, the communication related data received in step 300 is converted into labelling information in the following steps 304 and 306. In more detail, step 304 illustrates that parameter values in a communication habits vector are determined, or measured, by applying the fetched labelling rules on the received communication related data. As said above, the term communication habits vector is used in a logical sense and implies the measured values of a set of communication habits parameters reflecting different aspects of the users' communication habits.

The next step 306 illustrates that the customised labelling information is then determined for the terminal user(s) based on the communication habits vector, where the labelling information represents a description of the terminal user(s) with respect to their communication habits. As also said above, the customised labelling information may be defined in any manner as controlled by the third party according to the configured rules, e.g. in terms of the measured parameters as such or in more refined descriptive terms, without limitation to the invention. Finally, the determined labelling information is delivered to the third party in a further step 308.

As mentioned above, the communication habits vector is defined by a number of selected and predefined measurable communication habits parameters that can be measured for the users by means of the received communication related data. Some examples of communication habits parameters were also briefly mentioned above. The number and type of parameters can be freely configured in the labelling rules for each third party.

Figure 4:
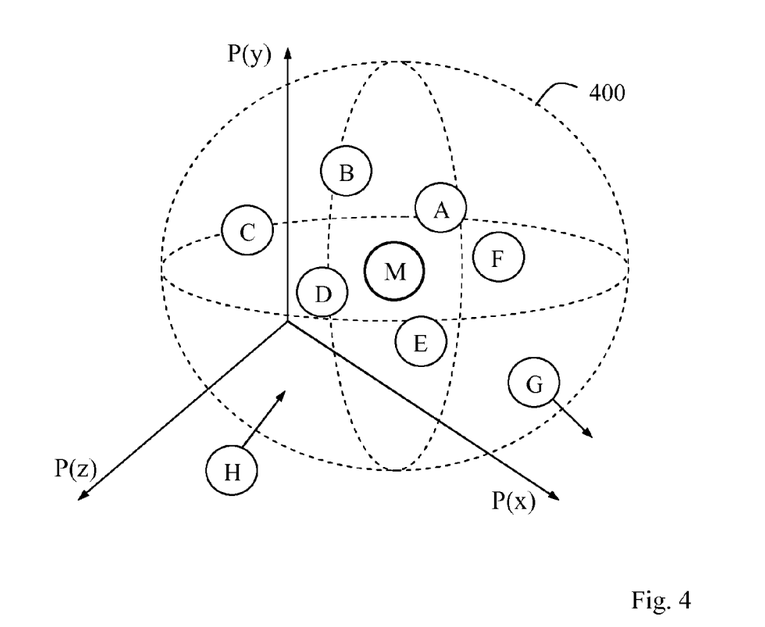
FIG. 4 is a schematic diagram illustrating an example of how a communication habits vector can be determined in the case of three different communication habits parameters, according to further embodiments.

FIG. 4 illustrates schematically one possible example of depicting such communication habits vectors in a logical multi-dimensional diagram for different users, in the case of having three communication habits parameters. Each selected and relevant parameter may thus correspond to a dimension, that is to say in a logical sense, and the communication habits vector will therefore be defined by values of each relevant communication habits parameter.

The three communication habits parameters $P(x)$, $P(y)$ and $P(z)$ thus form a logical three-dimensional space in this example, which is depicted in the figure as a logical 3-D parameter diagram. However, any number of parameters, or "dimensions", is possible without limitation to the invention. Parameter values have been collected for a plurality of users A, B, C, . . . and each user can therefore be represented in the diagram as a vector or 3-D projection where entity A has values $P(x)_A$, $P(y)_A$, $P(z)_A$, and so forth. It should be noted that the dimensions in this diagram are abstract or logic representations of the communication habits parameters, and not physical dimensions even though a communication habits parameter as such may relate to the geographical position of a user. A similar logical communication habits representation can also be made for groups of users having similar communication habits.

The diagram thus shows the users A, B, C, . . . at different spots in the 3-D projection and the parameter values in those spots define their communication habits vectors. Further, one or more maximum limits have been defined for each parameter as dictating the conditions for a particular label, category or class, which is shown as a label border 400 in this case. A similar label border can also be defined for one or more minimum parameter limits as well, not shown.

The label border is illustrated logically as a regular sphere in this example, although it can have any shape or contour in such a logical communication habits diagram depending on how the label conditions have been defined. A communication habits representative for the label may then effectively constitute a centroid or the equivalent, illustrated as "M" in the figure, representing any entities that fall inside the label border 400, thereby qualifying for the label. The communication habits representative M may be useful for describing any user falling inside and qualifying for the label, e.g. a cluster of users with similar communication habits.

In the situation shown in FIG. 4, the parameter values of different users A-G are currently located inside the label border 400, thereby qualifying those users to be characterised by the label, although users may move in the diagram over time due to changing communication habits parameter values, e.g. as determined in the steps 2:5 and 304 described above. In the example of FIG. 4, the communication habits vector of a user G is moving outside the label border 400 and will therefore be deemed unqualified, while the vector of a user H is moving inside the label border 400 to qualify user H for the label once inside the border 400. It should be understood that communication habits vectors can be determined for users in an equivalent manner also when more than 3 parameters are included.

Figure 5:
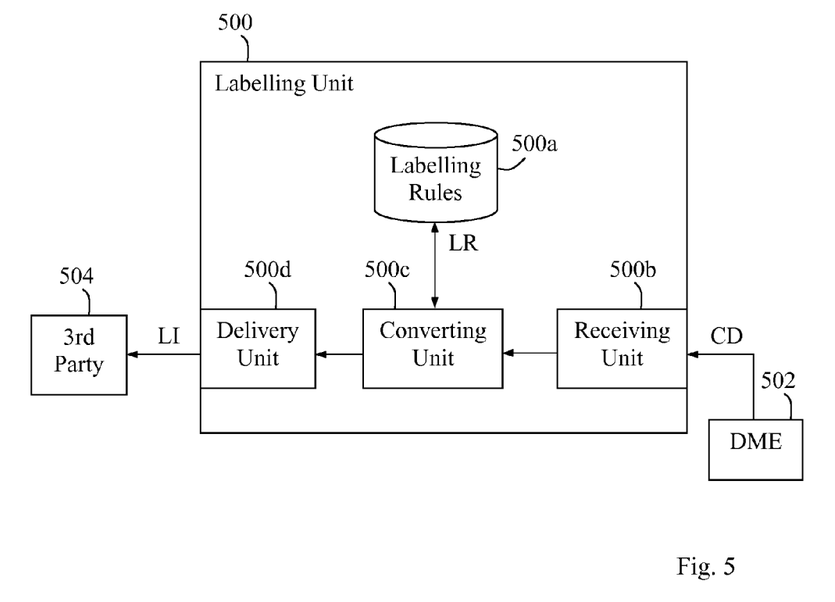
FIG. 5 is a schematic block diagram illustrating a labelling unit in more detail, according to further embodiments.

An exemplary labelling unit for providing labelling information to a receiving third party 504 regarding one or more terminal users in a communication network, will now be described in more detail with reference to the block diagram in FIG. 5, basically having the functionality described for FIG. 2 and FIG. 3. The labelling unit 500 can be implemented in or be connected to a data mining system which also includes a DME 502, i.e. the equivalent of DME 208 in FIG. 2, that provides communication related data, denoted "CD" in this figure, generated from executed communications of the terminal user(s), e.g. based on CDR information.

The labelling unit 500 comprises a receiving unit 500b adapted to receive the communication related data CD from DME 502, e.g. at predetermined intervals or on a more or less continuous basis or on demand. The labelling unit 500 also comprises a converting unit 500c adapted to fetch labelling rules from a storage unit 500a configured specifically for the third party, and to convert the received communication related data into labelling information as follows.

The data conversion executed by the converting unit 500c includes a first operation of determining values of parameters in a communication habits vector by applying the fetched labelling rules on the received communication related data. The data conversion may further include a second operation of determining labelling information for the terminal user(s) based on the communication habits vector, the labelling information representing a description of the terminal user(s) with respect to their communication habits. As said above, the labelling information may be determined to be the parameter values as is, or a more refined description or translation thereof.

Figure 2:
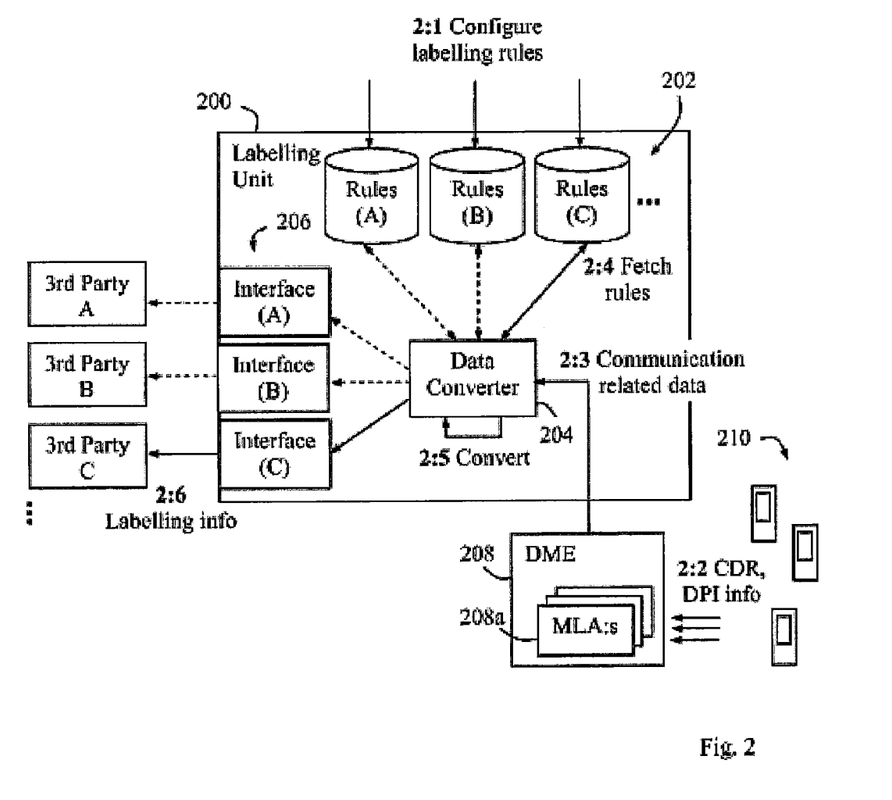
FIG. 2 is a schematic block diagram illustrating a procedure for providing labelling information to a receiving third party regarding terminal users in the network, according to one embodiment.
Figure 3:
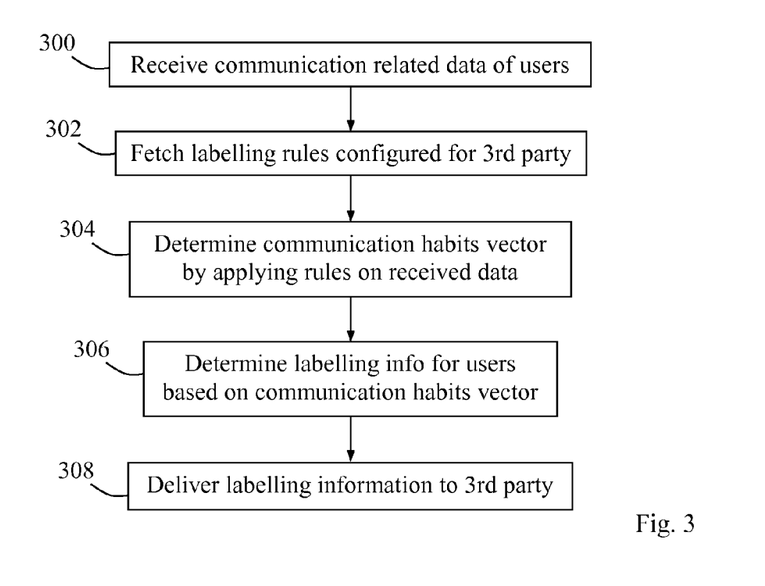
FIG. 3 is a flow chart illustrating a procedure for providing labelling information, according to another embodiment.

The labelling unit 500 also comprises a delivery unit 500d adapted to deliver the determined labelling information "LI" to the third party 504, e.g. using a specifically adapted communication interface as shown in FIG. 2 at 206.

The invention as exemplified by the above-described embodiments, can be used for various different purposes. For example, the process of obtaining information on the social relations between different users, from their communication habits and other sources such as address books, can be facilitated. Furthermore, the converting unit 500c may be configured with different modules for different functions depending on what type of labelling information is wanted according to the labelling rules of the third parties.

Figure 6:
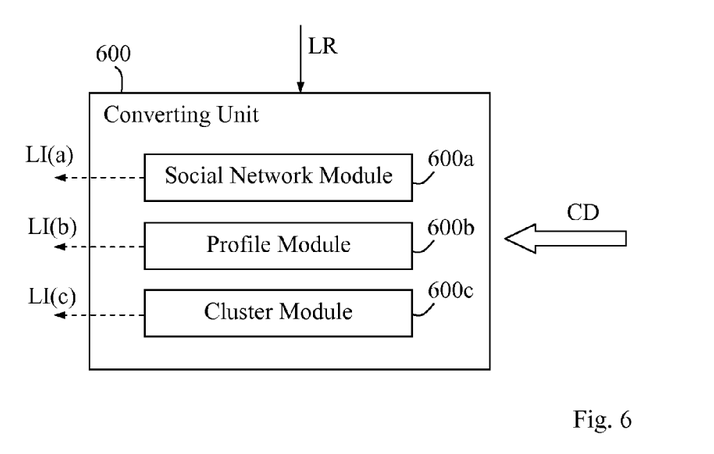
FIG. 6 is a schematic block diagram illustrating a converting unit in the labelling unit in more detail, according to further embodiments.

FIG. 6 illustrates an exemplary converting unit 600 having three functional modules including a social network module 600a adapted to create labelling information LI(a) relating to social network relations of the users. The labelling feature in the social network module 600a may contain algorithms for translating the communication related data into labels describing various social aspects, e.g. relating to the type and/or strength of social relations such as "friend", "acquaintance", "business partner" etc. When analysing the social aspects, combinations of geographical location, time of day, and so forth, may also be considered. However, this type of information may require further input from other sources than the traffic data which is however outside the scope of this invention.

The converting unit 600 further includes a profile module 600b adapted to generate a profile of a user by customising the user profile expressed in a format typically used by the DME, e.g. with so-called PCA (Principal Component Analysis) values representing the profile of the user or a centroid representing a typical user of a cluster that the user is qualified for. The customised labelling information may be expressed in terms of service levels 0-10, e.g. Messaging services 3, peer-to-peer services 4, etc., or in a more refined descriptive format e.g. "early adopter" or "traditionalist".

The converting unit 600 further includes a cluster module 600c adapted to generate a profile of a cluster of users by customising the cluster profile basically in the manner described above for the profile module 600b when generating a user profile.

The above-described invention can enable network operators to export knowledge of end users extracted via Machine learning functions or the like in the labelling unit to third parties, such as business analysts and vendors, in a more efficient way. Other examples of possible third parties are content providers such as IP TV operators, music download providers, or advertisements agencies or the like. The new feature will minimize the need for data mining experts, as explained above, which will only be required when configuring the customer specific labelling rules.

While the invention has been described with reference to specific exemplary embodiments, the description is generally only intended to illustrate the inventive concept and should not be taken as limiting the scope of the invention. The invention is defined by the appended claims.

The invention claimed is:

1. A method of providing labelling information to a receiving third party regarding one or more terminal users in a communication network, comprising the following steps executed by a labelling unit connected to a data mining system:
   receiving communication related data generated from executed communications of said one or more terminal users;
   fetching stored labelling rules which have been configured specifically for the third party;
   converting the received communication related data into labelling information, wherein a communication habits vector is determined by applying the fetched labelling rules on the received communication related data, and the labelling information is determined for the terminal user(s) based on the resulting communication habits vector, said labelling information representing a description of the terminal user(s) with respect to their communication habits,
   wherein the labelling rules are configured by defining the communication habits vector as a plurality of measurable communication habits parameters that correspond to different aspects of the communication habits of the terminal user(s), and configuring thresholds for each of the plurality of measurable communication habits parameters as limits for predefined user labels, classes or categories;
   generating a profile of the terminal user(s) by customising a user(s) profile expressed in a format used by a Data Mining Engine (DME) from which the communication related data is received; and
   delivering the determined labelling information to the third party, wherein the labelling information is delivered using a protocol and an interface adapted to the third party.

2. The method according to claim 1, wherein the delivered labelling information includes a label, category or class of the terminal user(s) as defined by the labelling rules.

3. The method according to claim 1, wherein the labelling information is described with a terminology independent of the underlying traffic types and communication techniques.

4. The method according to claim 1, wherein the communication habits vector is determined by determining the values of the communication habits parameters from the received communication related data, and a user label, class or category is determined based on said preconfigured limits for each parameter in the communication habits vector.

5. The method according to claim 1, wherein said communication habits vector is representative for a single terminal user or a cluster of plural terminal users having similar communication habits.

6. The method according to claim 1, wherein the communication related data is received from the DME as processed by one or more Machine Learning Algorithms (MLAs).

7. A labelling unit connected to a data mining system for providing labelling information to a receiving third party regarding one or more terminal users in a communication network, comprising circuitry configured to:
- receive communication related data generated from executed communications of said one or more terminal users;
- fetch stored labelling rules which have been configured specifically for the third party, and to convert the received communication related data into labelling information, including determining values of parameters in a communication habits vector by applying the fetched labelling rules on the received communication related data, and determining labelling information for the terminal user(s) based on the communication habits vector, said labelling information representing a description of the terminal user(s) with respect to their communication habits;
- store the labelling rules which have been configured by defining the communication habits vector as a plurality of measurable communication habits parameters that correspond to different aspects of the communication habits of the terminal user(s), and configuring thresholds for each of the plurality of measurable communication habits parameters as limits for predefined user labels, classes or categories;
- generate a profile of the terminal user(s) by customising a user(s) profile expressed in a format used by a Data Mining Engine (DME) from which the communication related data is received; and
- deliver the determined labelling information to the third party, wherein the labelling information is delivered using a protocol and an interface adapted to the third party.

8. The labelling unit according to claim 7, wherein the delivered labelling information includes a label, category or class of the terminal user(s) as defined by the labelling rules.

9. The labelling unit according to claim 7, wherein the labelling information is described with a terminology independent of the underlying traffic types and communication techniques.

10. The labelling unit according to claim 7, wherein the circuitry is further configured to determine the communication habits vector by determining the values of the communication habits parameters from the received communication related data, and determining a user label, class or category based on said preconfigured limits for each parameter in the communication habits vector.

11. The labelling unit according to claim 7, wherein said communication habits vector is representative for a single terminal user or a cluster of plural terminal users having similar communication habits.

12. The labelling unit according to claim 7, wherein the circuitry is further configured to receive the communication related data from the DME as processed by one or more Machine Learning Algorithms (MLAs).

13. The labelling unit according to claim 7, wherein the circuitry is further configured to:
- create labelling information relating to social network relations of the terminal user(s); and
- generate a profile of a cluster of terminal user(s) by customising a cluster profile expressed in said format used by the DME.

* * * * *